US012782146B2

(12) United States Patent
Li et al.

(10) Patent No.: US 12,782,146 B2
(45) Date of Patent: Nov. 3, 2026

(54) TEMPORARY TRAFFIC RESTRICTIONS FOR AUTONOMOUS VEHICLE ROUTING

(71) Applicant: GM Cruise Holdings LLC, San Francisco, CA (US)

(72) Inventors: Yike Li, Fremont, CA (US); Or Cohen, San Francisco, CA (US); Yufeng Liu, Moraga, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 4 days.

(21) Appl. No.: 18/401,942

(22) Filed: Jan. 2, 2024

(65) Prior Publication Data

US 2025/0216206 A1 Jul. 3, 2025

(51) Int. Cl.
*G01C 21/34* (2006.01)
*G01C 21/00* (2006.01)

(52) U.S. Cl.
CPC ..... *G01C 21/3415* (2013.01); *G01C 21/3492* (2013.01); *G01C 21/3807* (2020.08); *G01C 21/3837* (2020.08); *G01C 21/3867* (2020.08)

(58) Field of Classification Search
CPC ............ G01C 21/3415; G01C 21/3867; G01C 21/3837; G01C 21/3807; G01C 21/3492
See application file for complete search history.

(56) References Cited

PUBLICATIONS

ArcGIS https://web.archive.org/web/20230330193730/https://doc.arcgis.com/en/indoors/latest/viewer/configure-route-barriers.htm, Mar. 2023 (Year: 2023).*

Bonetti, "HERE and Mobileye: crowd-sourced HD mapping for autonomous cars", https://www.here.com/learn/blog/here-and-mobileye-crowd-sourced-hd-mapping-for-autonomous-cars (Year: 2016).*

* cited by examiner

*Primary Examiner* — Aryan E Weisenfeld
(74) *Attorney, Agent, or Firm* — Honigman LLP; Matthew H. Szalach

(57) ABSTRACT

Vehicles detect temporary traffic restrictions and provide information describing the traffic restrictions to a remote computer system. The remote computer system can determine a routing cost for the traffic restriction and alert other vehicles in a fleet of vehicles about the traffic restrictions. The other vehicles can account for the routing cost when determining a route to follow; the route may avoid the traffic restriction. Vehicles in the fleet, when driving near a particular traffic restriction, may perceive the area where the traffic restriction was detected and provide updates about the traffic restriction, e.g., whether the boundaries of the TTR have changed (e.g., a construction area or emergency response has expanded or moved), or the TTR has been removed (e.g., a construction area has reopened, or a stopped vehicle has left the roadway).

20 Claims, 7 Drawing Sheets

100

TEMPORARY TRAFFIC RESTRICTIONS FOR AUTONOMOUS VEHICLE ROUTING

TECHNICAL FIELD OF THE DISCLOSURE

The present disclosure relates generally to autonomous vehicles and, more specifically, to methods and systems for identifying temporary traffic restrictions using data from autonomous vehicles, and routing autonomous vehicles based on the identified temporary traffic restrictions.

BACKGROUND

Fleets of autonomous vehicles (AVs) can provide various travel services, such as passenger transport and delivery transport. AVs carry out such services by autonomously driving along a network of interconnected roads. The AVs may not be able to travel on a road or a portion of a road (e.g., one or more lanes of a road) due to a temporary blockage, such as construction, a traffic accident, a double-parked vehicle, etc. These temporary blockages are disruptive to all vehicles, and can be particularly difficult for AVs to navigate. In some cases, unexpected blockage can cause AVs to become stuck, and remote assistance may be needed to help the AV navigate around the blockage.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
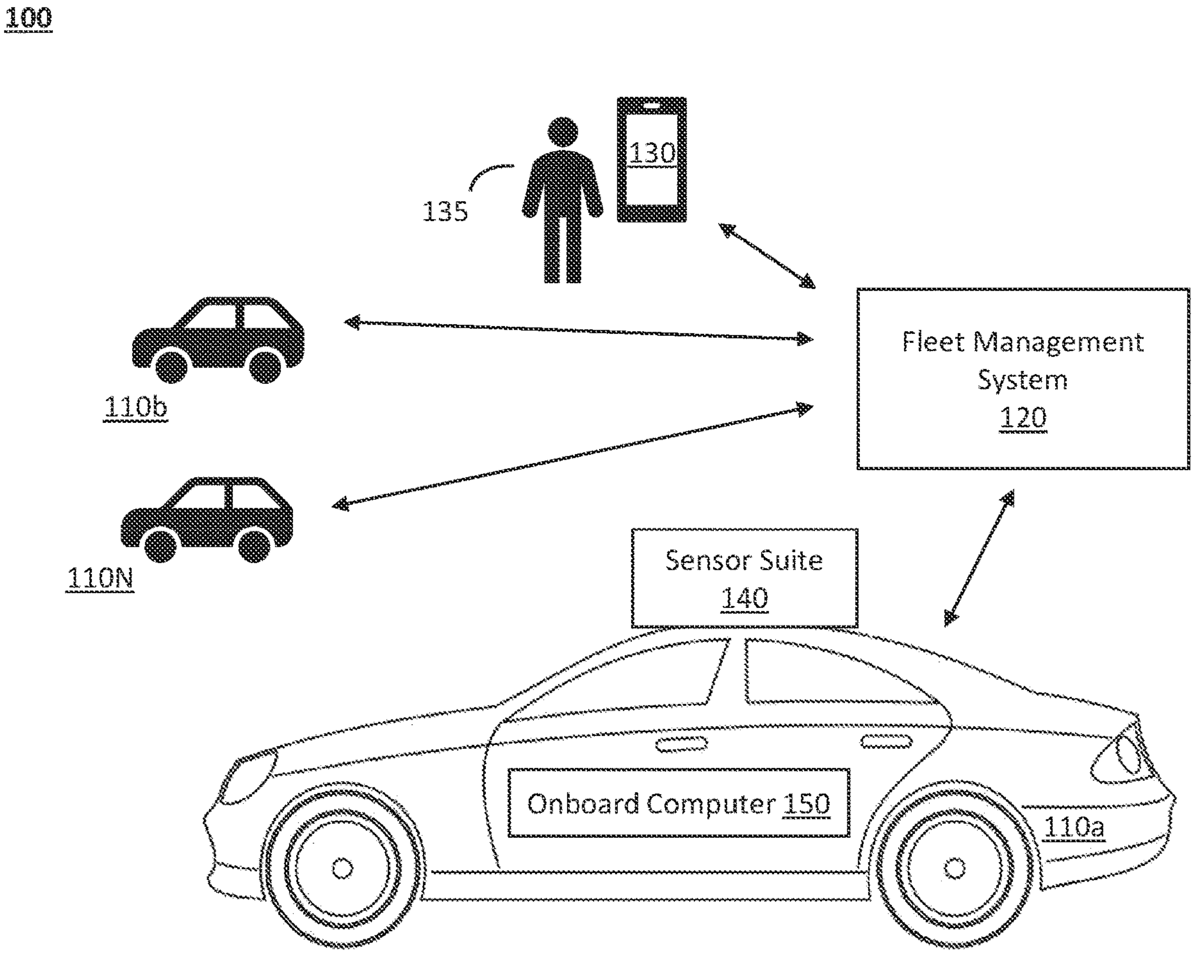
FIG. 1 is a block diagram illustrating a system including an example AV fleet and fleet management system according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

AVs travel between locations on networks of roads. Road networks are dynamic, with new roads being added to the network, and roads or lanes being closed permanently or temporarily. For example, a road or portion of a road may be temporarily closed due to construction, a car accident and a related emergency response, a disabled vehicle blocking a lane, a double-parked vehicle, a fallen tree, telephone pole, or other debris blocking a lane or road. Such temporary road or lane closures or blockages are referred to herein as temporary traffic restrictions (TTRs). TTRs affect vehicles' abilities to drive on a particular lane or roadway, and may in particular create challenges for AVs. For example, if a full roadway is blocked, AVs (and other vehicles) cannot navigate the roadway, and vehicles may need to back up or turn around and take a different route, which can be difficult and time-consuming. If only a portion of the roadway is blocked (e.g., a right-most lane in a four-lane road, with two lanes traveling in each direction), vehicles can navigate around the blockage, but making the necessary maneuvers in view of traffic and other factors also takes time. For example, if an AV in the right lane is prevented from moving forward by a TTR in the right lane, the AV may wait for a break in traffic in the left lane and then move into the left lane to navigate around the TTR. It can take time for the AV to merge into the left lane, and such maneuvers may be more difficult for AVs than for human drivers. For example, in some cases, a blocked lane or roadway may cause an AV to become stuck, such that the AV is unable to autonomously navigate further. In some cases, remote assistance or other interventions may be needed to help the AV continue driving.

As AVs navigate the road network, their sensors capture data about their environment, such as images captured by cameras and point clouds captured by radar sensors and/or light detecting and ranging (lidar) sensors. The captured data can include data describing TTRs, e.g., images and point clouds of TTRs. The AV has an onboard computer, which can be programmed to detect TTRs and to determine various properties of TTRs. For example, a perception system executing on the AV's onboard computer can receive sensor data and determine, based on the sensor data, a type of TTR (e.g., a construction site or an emergency response), a location of the TTR (e.g., a longitude and latitude, or a particular portion of a roadway), and a shape of the TTR (e.g., one or more physical boundaries of the TTR; one or more lanes into which the TTR extends). The AV can use this information about the TTR to navigate around the TTR, e.g., planning a path that avoids a detected TTR, or driving at a low speed until the AV has gotten past the TTR.

As described herein, the AV can provide information describing the TTR to a remote computer system that communicates, directly or indirectly, with the AV and one or more additional AVs. For example, the remote computer system may be a cloud-based fleet management system that receives data from and transmits data to AVs in a fleet. The fleet management system can alert other AVs in the fleet about the TTRs, so that other AVs can avoid the TTRs when autonomously navigating the road network. AVs in the fleet, driving near a particular TTR, may perceive the area of the TTR was detected and provide updates about the TTR, e.g., whether the boundaries of the TTR have changed (e.g., a construction area or emergency response has expanded or moved), or the TTR has been removed (e.g., a construction area has reopened, or a stopped vehicle has left the roadway).

In one embodiment, the fleet management system receives data describing a TTR from an AV. The data may include the location of the TTR and a shape of the TTR. The shape may be represented as a two-dimensional polygon representing a portion of a roadway that cannot be traversed. The fleet management system generates a routing cost for the TTR, where the routing costs represents or relates to a time for an AV to navigate around the polygon. For example, if one lane of a four-lane road is blocked by a TTR, the fleet management system may set a cost of 1 minute for the AV to navigate past the TTR. The fleet management system may set the routing cost based on historical driving data, including the amount of time AVs have historically been delayed by similar TTRs. Data describing the TTR, including the location and routing cost, is used for routing other AVs in the fleet. For example, the TTR data may be added to a map database used to calculate routes and/or transmitted to AVs in the fleet, so that AVs can generate paths that take the TTRs into consideration. For example, another AV in the fleet, receiving the TTR data for a particular AV, may generate a path for the AV to follow that avoids the TTR.

The fleet management system may also generate a duration for the routing cost. The duration refers to the amount of time that the routing cost is considered when determining routes; for example, after an hour, the fleet management system may assume that a TTR has ended. The duration may be fixed (e.g., to a default time of one hour) or generated based on one or more rules (e.g., different types of TTRs may have different expected durations) or models. In some cases, if, after the TTR was initially detected, another AV detects the same TTR, the duration may be extended, e.g., an hour timer for the routing cost may be restarted.

As will be appreciated by one skilled in the art, aspects of the present disclosure, in particular aspects of identifying traffic restrictions and propagating information about the traffic restrictions to other AVs, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of certain specific embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example AV Fleet and Fleet Management System

FIG. 1 is a block diagram illustrating a system 100 including an example AV fleet and fleet management system according to some embodiments of the present disclosure. The system 100 includes a fleet of AVs 110, including AV 110*a*, AV 110*b*, and AV 110N, a fleet management system 120, and a user device 130. For example, a fleet of AVs may include a number N of AVs, e.g., AV 110*a* through AV 110N. AV 110*a* includes a sensor suite 140 and an onboard computer 150. AVs 110*b* through 110N also include the sensor suite 140 and onboard computer 150. A single AV in the fleet is referred to herein as AV 110, and the fleet of AVs is referred to collectively as AVs 110.

The fleet management system 120 receives service requests for the AVs 110 from user devices, such as user device 130. For example, the user 135 accesses an app executing on the user device 130 and, using the app, enters a ride request including a pickup location and a drop-off location. The fleet management system 120 dispatches AVs 110 to carry out the service requests. The fleet management system 120 also maintains a map database. When an AV 110 is dispatched for a service request, the fleet management system 120 and/or the AV 110 determines a route for the AV 110 to follow based on the data in the map database. The map database may include data describing TTRs, where the data describing TTRs is generated based on data collected by one or more AVs 110, as described herein.

The AV 110 is preferably a fully autonomous automobile, but may additionally or alternatively be any semi-autonomous or fully autonomous vehicle; e.g., a boat, an unmanned aerial vehicle, a self-driving car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include photodetectors, cameras, radar, sonar, lidar, GPS, wheel speed sensors, inertial measurement units (IMUs), accelerometers, microphones, strain gauges, pressure monitors, barometers, thermometers, altimeters, etc. The sensors may be located in various positions in and around the AV 110. The sensor suite 140 is described further in relation to FIG. 4.

An onboard computer 150 is connected to the sensor suite 140 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. For example, the onboard computer 150 maneuvers the AV 110 according to routing selections determined by an onboard or remote navigation system. The onboard computer 150 also collects data describing roads on which the AV 110 travels or in the vicinity of the AV 110 and transmits the collected data to the fleet management system 120, which may incorporate the collected data into the map database.

The onboard computer 150 is preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems. The onboard computer 150 is described further in relation to FIG. 5.

The fleet management system 120 manages the fleet of AVs 110. The fleet management system 120 may manage a service that provides or uses the AVs 110, e.g., a service for providing rides to users with the AVs 110, or a service that delivers items, such as prepared foods, groceries, or packages, using the AVs 110. The fleet management system 120 may select an AV from the fleet of AVs 110 to perform a particular service or other task, and instruct the selected AV (e.g., AV 110*a*) to autonomously drive to a particular location (e.g., a pickup address or a delivery address). The fleet management system 120 may maintain a map database that the AVs 110 rely on to determine routes and paths through the road network. The fleet management system 120 also manages fleet maintenance tasks, such as charging and servicing of the AVs 110.

As shown in FIG. 1, each of the AVs 110 communicates with the fleet management system 120. For example, an AV 110*a* may transmit data describing its environment, including perceived traffic restrictions, to the fleet management system 120. The fleet management system 120 may propagate data describing the traffic restriction to the fleet of AVs 110. The AVs 110 and fleet management system 120 may connect over a public network, such as the Internet. The fleet management system 120 is described further in relation to FIG. 6.

The user device 130 is a personal device of the user 135, e.g., a smartphone, tablet, computer, or other device for interfacing with a user of the fleet management system 120. The user device 130 may provide one or more applications (e.g., mobile device apps or browser-based apps) with which the user 135 can interface with a service that provides or uses AVs. The service, and the AVs 110 associated with the service, are managed by the fleet management system 120, which may also provide the application to the user device 130. In other embodiments, the service is managed by a separate system (e.g., a food delivery service) that relies on the AV fleet for some or all of its transportation tasks and interacts with the fleet management system 120 to arrange transportation tasks. An application provided by the fleet management system 120 may provide various user interfaces to the user 135. In particular, the application may display coverage maps determined by the coverage system of the fleet management system 120, described below. In other examples, the coverage maps and/or other coverage information may be provided from the fleet management system 120 to a second service provider, which may provide coverage maps and/or coverage information to the user devices 130 through a separate application.

Example Temporary Traffic Restrictions

Figure 2:
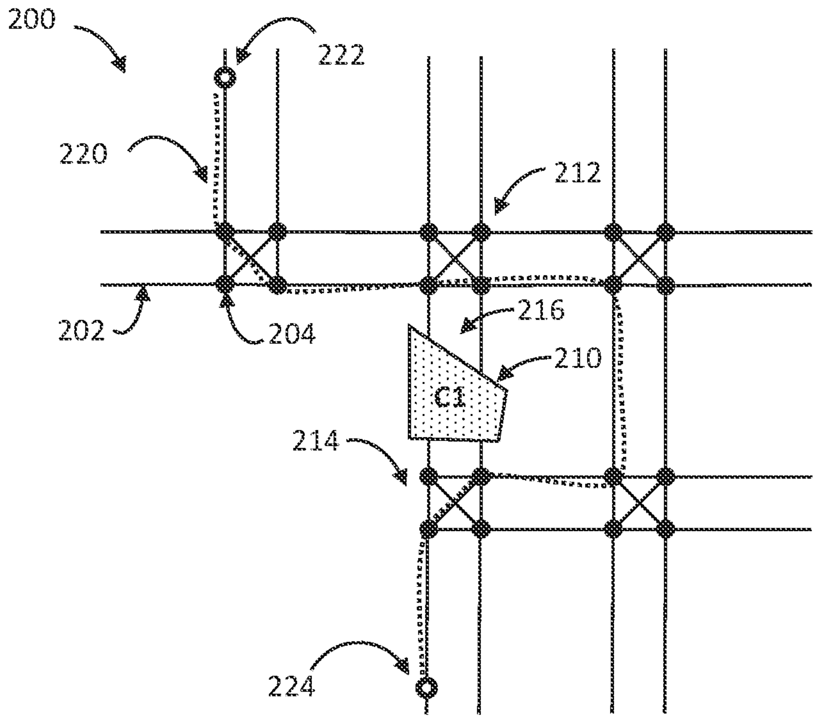
FIG. 2 is an example map with a full-road blockage according to some embodiments of the present disclosure.
Figure 3:
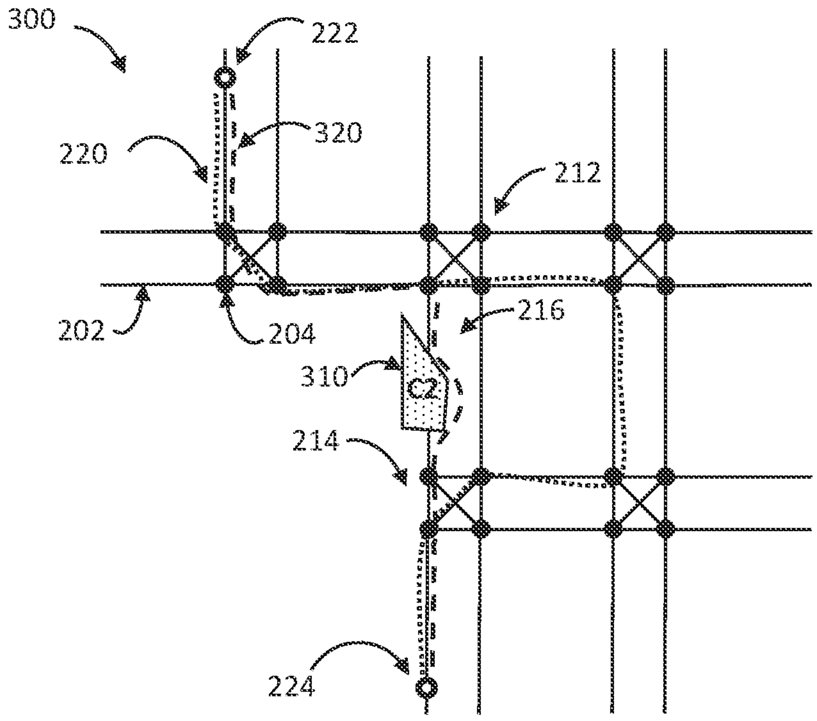
FIG. 3 is an example map with a partial-road blockage according to some embodiments of the present disclosure.

FIGS. 2 and 3 illustrate example map areas that include TTRs, and example routes that an AV may traverse based on the TTRs. FIG. 2 is an example map 200 with a full-road blockage, and FIG. 3 is an example map with a partial-road blockage.

Turning first to FIG. 2, the map 200 includes lanes, represented as lines 202. Connections between lanes are represented as nodes, e.g., node 204. A TTR 210 extends across two lanes (represented by two lines) of a road 216; the TTR 210 blocks the roadway 216 between the intersections 212 and 214, so that AVs cannot traverse the section of roadway 216. The TTR 210 has a shape that is represented as a polygon with four sides. The TTR 210 also has a cost C1, which represents a cost to route along the roadway 216. The cost C1 may be infinite, representing that an AV 110 cannot traverse the road 216. Alternatively, the cost C1 may be set to a sufficiently high value such that, in most cases, a routing algorithm does not select a route that traverses the TTR 210. The shape of the polygon may be determined by an AV 110 and/or the fleet management system 120 based on data captured by the AV 110, as described with respect to FIGS. 5-8. The cost C1 may also be determined by the fleet management system 120, as described further with respect to FIGS. 6 and 7.

The map 200 further includes an example route 220 from an origin point 222 to a destination point 224. The route 220 may be a route calculated by an AV 110 or the fleet management system 120 for the AV 110 to traverse the area represented by the map 200. Due to the TTR 210, and, in particular, the routing cost C1 associated with the TTR 210, the route 220 traverses a roadway parallel to the roadway 216 so that the route 220 avoids the TTR 210.

Turning now to FIG. 3, the map 300 includes the lanes and nodes of FIG. 2. A second TTR 310 extends across one lane of the road 216; if the road 216 is a two-lane road with one lane traveling in either direction, the TTR 310 blocks the lane in one direction of travel. If the road 216 is a one-way street with two lanes, the TTR 310 blocks one of the lanes. The TTR 310 has a shape that is represented as a polygon with four sides. The TTR 310 also has a cost C2, which may represent a cost to traverse the roadway 216, or a cost to traverse the blocked lane of the roadway 216. In this case, because the roadway 216 can be traversed, the cost C1 may be set to a value related to a delay expected for an AV 110 attempting to traverse the blocked lane. The shape of the polygon may be determined by an AV 110 and/or the fleet management system 120 based on data captured by the AV 110, as described with respect to FIGS. 5-8. The cost C2 may also be determined by the fleet management system 120, as described further with respect to FIGS. 6 and 7.

The map 300 includes the route 220 from FIG. 2, which avoids the roadway 216, as well as a second route 320 between an origin point 222 to a destination point 224. The routes 220 and 320 may be two routes calculated by an AV 110 or the fleet management system 120 for the AV 110 to traverse the area represented by the map 200. The second route 320 traverses the roadway 216 and includes a path around the TTR 310. The path around the TTR 310 may extend into the other, unblocked lane of the roadway 216. The AV 110 or fleet management system 120 may compare the total cost of the route 220 (which includes the detour around the roadway 216) to the total cost of the route 320 (which includes the path around the TTR 310 along the roadway 216) to determine whether to have the AV 110 navigate along the route 220 or the route 320.

Example Sensor Suite

Figure 4:
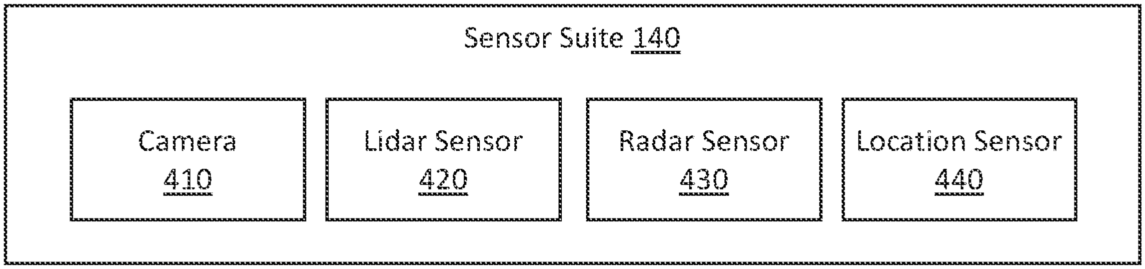
FIG. 4 is a block diagram illustrating example components of a sensor suite of an AV according to some embodiments of the present disclosure.

FIG. 4 is a block diagram illustrating example components of a sensor suite 140, according to some embodiments of the present disclosure. FIG. 4 includes various sensors that may be included in a sensor suite of a vehicle. The sensor suite 140 includes a set of environmental sensors, e.g., a camera 410, a lidar sensor 420, a radar sensor 430. The sensor suite 140 further includes a location sensor 440. While one of each of the sensors 410, 420, 430, and 440 is shown in FIG. 4, the sensor suite 140 may include more than one of each of these components, e.g., to capture the environment from different positions and angles, or for redundancy.

The sensor suite 140 includes multiple types of environmental sensors, each of which has different attributes and advantages. Combining data from multiple sensors and different sensor types allows an AV (e.g., the AV 110) to obtain a more complete view of its environment. For example, combining data from multiple sensors and different types of sensors allows a vehicle to learn about its environment in different conditions, e.g., at different travel speeds, and in different lighting conditions.

Different and/or additional components not shown in FIG. 4 may be included in the sensor suite 140. For example, the sensor suite 140 may also include photodetectors, sonar, GPS, wheel speed sensors, IMUs, accelerometers, microphones, strain gauges, pressure monitors, barometers, thermometers, altimeters, etc., as described with respect to the sensor suite 140 of FIG. 1. In some embodiments, a single sensor or set of sensors may obtain location and speed data, e.g., the sensor suite 140 may include one or more IMUs and GPS sensors, which collect data that can be used to derive speed and location.

The camera 410 captures images of the environment around the AV 110. The sensor suite 140 may include multiple cameras 410 to capture different views, e.g., a front-facing camera, a back-facing camera, and side-facing cameras. The cameras 410 may be implemented using high-resolution imagers with fixed mounting and field of view. One or more cameras 410 may capture light at different frequency ranges. For example, the sensor suite 140 may include one or more infrared cameras and/or one or more ultraviolet cameras in addition to visible light cameras.

The lidar sensor 420 measures distances to objects in the vicinity of the AV 110. The lidar sensor 420 may be a scanning lidar that provides a point-cloud of the region scanned. The lidar sensor 420 may have a fixed field of view or a dynamically configurable field of view.

The radar sensor 430 measures ranges and speeds of objects in the vicinity of the AV 110 using reflected radio waves. The radar sensor 430 may be implemented using a scanning radar with a fixed field of view or a dynamically configurable field of view. As described with respect to the cameras 410, the sensor suite 140 may include multiple radar sensors 430 to capture different fields of view. Radar sensors 430 may include articulating radar sensors, long-range radar sensors, short-range radar sensors, or some combination thereof.

In some embodiments, other types of time-of-flight sensors, such as time-of-flight cameras, infrared depth sensors, 3D scanners, structured light scanners, or other types of ranging techniques are used in addition to or instead of lidar and/or radar. Any time-of-flight sensor or ranging sensor may provide data in the form of a point cloud, or data (e.g., range data) from which a point cloud may be derived.

The location sensor 440 determines a current location of the AV 110. The location sensor 440 may include or be coupled to a GPS sensor and one or more IMUs and/or accelerometers. The location sensor 440 may include a processing unit (e.g., a module of the onboard computer 150, or a separate processing unit) that receives signals (e.g., GPS data and IMU data) to determine the current location of the AV 110.

Example Onboard Computer

Figure 5:
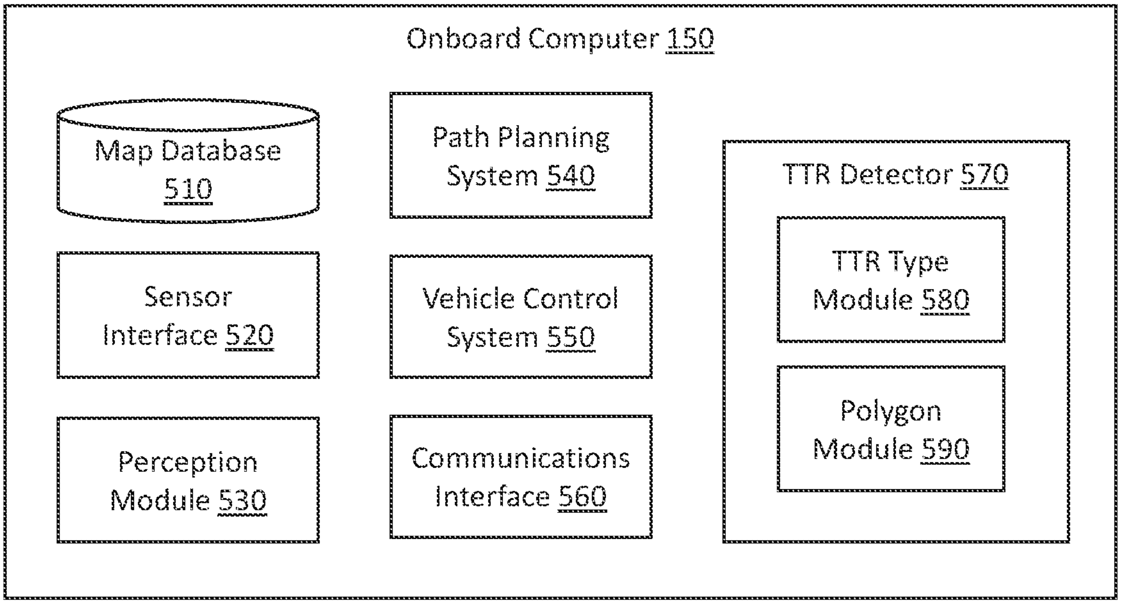
FIG. 5 is a block diagram illustrating example components of an onboard computer of an AV according to some embodiments of the present disclosure.

FIG. 5 is a block diagram illustrating example components of an onboard computer 150 of an AV according to some embodiments of the present disclosure. The onboard computer 150 includes a map database 510, a sensor interface 520, a perception module 530, a path planning system 540, a vehicle control system 550, a communications interface 560, and a TTR detector 570 that includes a TTR type module 580 and a polygon module 590. In alternative configurations, fewer, different and/or additional components may be included in the onboard computer 150. For example, components and modules for controlling various vehicle functions (e.g., heating and cooling, user interactions, doors and windows, etc.), and components and modules for communicating with other systems, such as the fleet management system 120, are not shown in FIG. 5. Further, functionality attributed to one component of the onboard computer 150 may be accomplished by a different component included in the onboard computer 150 or a different system from those illustrated.

The map database 510 stores a detailed map that includes a current environment of the AV 110. The map database 510 includes data describing roadways (e.g., locations of roadways, connections between roadways, roadway names, speed limits, traffic flow regulations, toll information, etc.) and data describing buildings (e.g., locations of buildings, building geometry, building types). The map database 510 may further include data describing other features, such as bike lanes, sidewalks, crosswalks, traffic lights, parking lots, etc. The map database 510 may include data describing TTRs perceived by one or more other AVs 110, as described herein. For example, the map database 510 may include, for each TTR, a location of the TTR, a polygon describing the shape of the TTR, a routing cost for the TTR, and a duration or expiration time of the TTR. An expiration time of the TTR may be set by the fleet management system 120, as described below; if the expiration time has passed, the TTR may be removed from the map database 510 and/or not considered by the path planning system 540.

The sensor interface 520 interfaces with the sensors in the sensor suite 140. The sensor interface 520 is configured to receive data captured by sensors of the sensor suite 140, described above. For example, the sensor interface 520 may have subcomponents for interfacing with individual sensors or groups of sensors of the sensor suite 140, such as a camera interface, a lidar interface, a radar interface, a location sensor interface, etc. The sensor interface 520 may request data from the sensor suite 140, e.g., by requesting that a sensor capture data in a particular direction or at a particular time. For example, in response to the onboard computer 150 (e.g., the path planning system 540) determining that the AV 110 is near a particular TTR included in the map database 510, the sensor interface 520 may capture data in the direction of the TTR; the TTR detector 570 and/or the fleet management system 120 may use this captured data to determine whether the TTR is still present, and whether the shape or other properties of the TTR have changed.

The perception module 530 identifies objects in the environment of the AV 110. The sensor suite 140 produces a data set that is processed by the perception module 530 to detect other cars, pedestrians, trees, bicycles, and objects traveling on or near a road on which the AV 110 is traveling or stopped, and indications surrounding the AV 110 (such as construction signs, traffic cones, traffic lights, stop indicators, and other street signs). For example, the data set from the sensor suite 140 may include images obtained by cameras, point clouds obtained by lidar (light detecting and ranging) sensors, and data collected by radar sensors. The perception module 530 may include one or more classifiers trained using machine learning to identify particular objects. For example, a multi-class classifier may be used to classify each object in the environment of the AV 110 as one of a set of potential objects, e.g., a vehicle, a pedestrian, or a cyclist. As another example, a human classifier recognizes humans in the environment of the AV 110, a vehicle classifier recognizes vehicles in the environment of the AV 110, etc.

In some embodiments, the perception module 530 executes one or more processes for identifying TTRs and/or determining attributes or properties of TTRs. For example, the perception module 530 may include one or more software modules described below with respect to the TTR detector 570.

The path planning system 540 plans maneuvers for the AV 110 based on map data retrieved from the map database 510, data received from the perception module 530, and navigation information, e.g., a destination location instructed by the fleet management system 120 and a current location of the AV 110. The path planning system 540, or a separate routing system, may determine a route to the destination based on data in the map database 510. The path planning system 540 may select a path based on routing costs, e.g., the path planning system 540 may calculate the total routing costs of the routes 220 and 320 shown in FIG. 3, and select a route that minimizes the routing cost.

The path planning system 540 may further make more granular path decisions, e.g., selecting a particular lane on a given stretch of road for the AV 110 to travel along, or selecting a path that involves changing from one lane to another lane at a particular point along the roadway. The path planning system 540 may further determine speeds and/or accelerations at different points along a determined path. At this level, the path planning system 540 may also consider TTRs included in the map database 510 (e.g., selecting a lane that avoids a TTR) and/or new TTRs detected by the perception module 530. The path planning system 540 may continuously modify the path based on additional inputs from the sensor interface 520 and/or perception module 530, e.g., to account for behavior of surrounding traffic, pedestrians, bicyclists, etc.; to account for dynamic traffic signals; and based on other real-time factors.

In some embodiments, the path planning system 540 receives map data from the map database 510 describing known, relatively fixed features and objects in the environment of the AV 110. For example, the map data includes data describing roads as well as buildings, bus stations, trees, fences, sidewalks, etc. The path planning system 540 receives data from the perception module 530 describing at least some of the features described by the map data in the environment of the AV 110. The path planning system 540 determines a pathway for the AV 110 to follow. The pathway includes locations for the AV 110 to maneuver to, and timing and/or speed of the AV 110 in maneuvering to the locations. The path planning system 540 outputs the pathway to the vehicle control system 550.

The vehicle control system 550 instructs the movement-related subsystems of the AV 110 to maneuver according to the pathway determined by the path planning system 540. The vehicle control system 550 may include the throttle interface for controlling the engine throttle, motor speed (e.g., rotational speed of electric motor), or any other movement-enabling mechanism; the brake interface for controlling the brakes of the AV 110 (or any other movement-retarding mechanism); and the steering interface for controlling steering of the AV 110 (e.g., by changing the angle of wheels of the AV).

The communications interface 560 enables the AV 110 to communicate with other systems or servers. The communications interface 560 may interact with one or more communications components on the AV 110, e.g., a cellular data transmitter and receiver. For example, the communications interface 560 communicates with the fleet management system 120, e.g., to receive instructions from the fleet management system 120 to drive to a particular destination, or to receive updates to the map database 510, such as new TTRs identified by other AVs 110. As another example, if the TTR detector 570 detects a TTR, the communications interface 560 transmits data describing the TTR to the fleet management system 120.

The TTR detector 570 includes hardware and/or software configured to process data from the sensor interface 520 and/or from the perception module 530 to detect a TTR in the environment of the AV 110. For example, the TTR detector 570 includes one or more machine-learned models (e.g., one or more classification models) trained to recognize construction sites, emergency vehicles, areas blocked for an emergency response, disabled vehicles, trees or other debris blocking a roadway or portion of a roadway, or other types of TTRs. The TTR detector 570 may include modules for performing processes to determine particular properties of a detected TTR. In the example shown in FIG. 5, the TTR detector 570 includes a TTR type module 580 to determine a type of TTR (e.g., a construction site, an emergency response, debris, etc.) and a polygon module 590 to determine a polygon in which the TTR extends.

In some embodiments, the TTR detector 570 and/or the perception module 530 detect, based on sensor data, a blocked roadway; the TTR detector 570 and/or the perception module 530 (e.g., the TTR type module 580) may then determine a type of TTR causing the blocked roadway. In some embodiments, the TTR detector 570 and/or the perception module 530 detect one or more objects in a roadway, such as an emergency vehicle, flares, a sign within the roadway, a tree, that may be indicative of a TTR; the TTR detector 570 (e.g., the TTR type module 580) may perform further processing of the environmental data to determine that the detected object or objects in the roadway correspond to a TTR.

As one example, the perception module 530 uses a first model that processes sensor data (e.g., image data) to identify an emergency vehicle in the roadway. The perception module 530 may identify the emergency vehicle using an image classification model. The perception module 530 may next determine that the identified emergency vehicle is stationary (e.g., based on lidar and/or radar data). The TTR detector 570 may receive data from the perception module 530 describing the stationary emergency vehicle and/or the environment of the emergency vehicle, e.g., objects in front of or behind the emergency vehicle, and a length of time that the emergency vehicle has been stationary. The TTR type module 580 may use this data and/or additional data from the sensor interface 520 to identify a TTR, where the TTR includes the emergency vehicle. In this case, the TTR type module 580 may identify an emergency response type of TTR.

The polygon module 590 may further process captured data (e.g., the image data and/or lidar data) and/or data from the perception module 530 to determine a region of the roadway that is blocked by an emergency response. For example, if the emergency vehicle is responding to a traffic accident, the polygon module 590 may determine a portion of the road that is blocked due to the traffic accident, e.g., an area that surrounds the vehicles involved in the accident, the vehicles responding to the accident, and any debris in the roadway from the accident. The polygon module 590 generates a polygon around the blocked area, where the polygon may be a two-dimensional shape that includes at least a portion of the roadway.

The sensor interface 520 may capture new data at a high frequency, e.g., multiple times per second. The newly captured data may be processed by the TTR detector 570 at a correspondingly high frequency or at a lower frequency. For example, if the sensor interface 520 captures environmental data 10 times a second (i.e., a 10 Hz capture rate), the TTR detector 570 may perform a detection algorithm using downsampled image data at a lower frequency, e.g., once per second. The TTR detector 570 may perform detections of the TTR over a period of time, e.g., over 10 seconds or 1 minute, and report a TTR to the fleet management system 120 after certain conditions have been met, e.g., the TTR is detected for at least a threshold time period (e.g., for at least 30 seconds, or for as long as the AV 110 is able to detect the TTR, which may be shorter than a set time threshold the AV 110 is moving). Alternatively, the TTR detector 570 transmits captured data describing a detected TTR to the fleet management system 120, and a TTR system in the fleet management system 120 determines whether to create a TTR in the map database, as described below.

Example Fleet Management System

Figure 6:
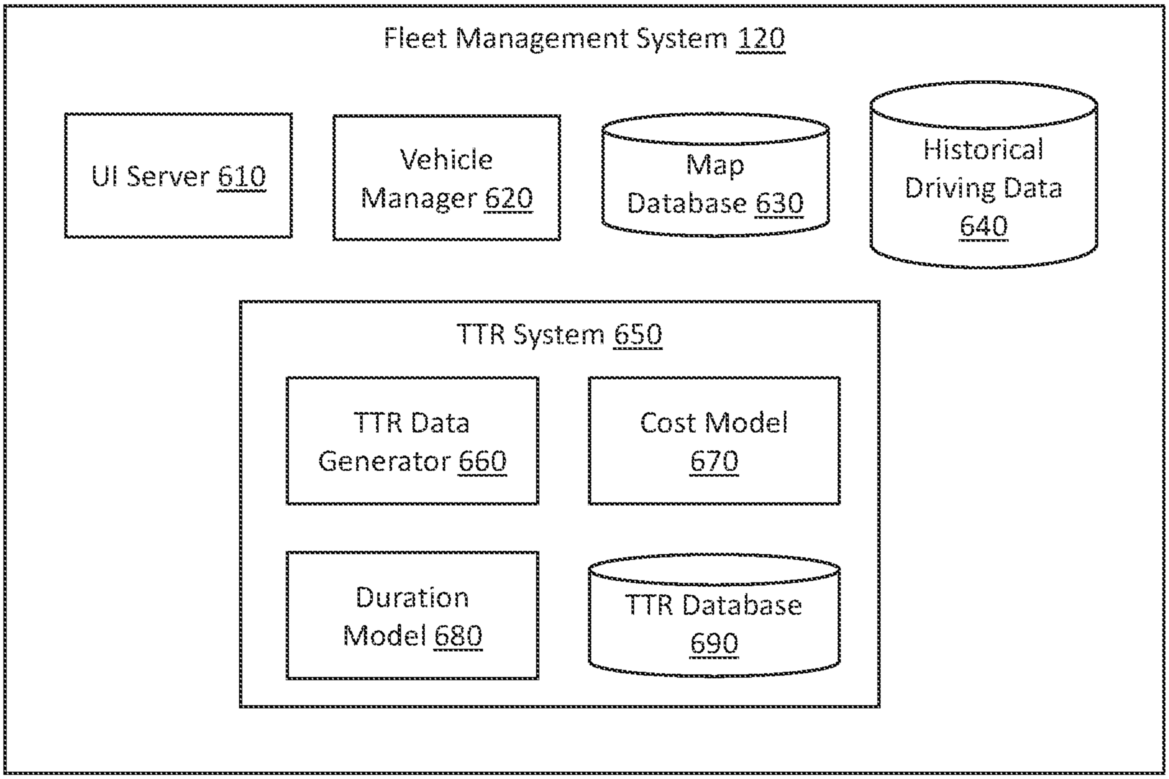
FIG. 6 is a block diagram illustrating example components of a fleet management system according to some embodiments of the present disclosure.

FIG. 6 is a block diagram illustrating the fleet management system 120 according to some embodiments of the present disclosure. The fleet management system 120 includes a UI (user interface) server 610, a vehicle manager 620, a map database 630, historical driving data 640, and a TTR system 650 that includes a TTR data generator 660, a cost model 670, a duration model 680, and a TTR database 690. In alternative configurations, different and/or additional components may be included in the fleet management system 120. Further, functionality attributed to one component of the fleet management system 120 may be accomplished by a different component included in the fleet management system 120 or a different system than those illustrated.

The UI server 610 is configured to communicate with client devices, such as user device 130, that provide a user interface to users. For example, the UI server 610 may be a web server that provides a browser-based application to client devices, or the UI server 610 may be a mobile app server that interfaces with a mobile app installed on client devices. The user interface enables the user to access a service of the fleet management system 120, e.g., to request a ride from an AV 110, or to request a delivery from an AV 110.

The vehicle manager 620 manages and communicates with a fleet of AVs, including AVs **110*a* through 110N. The UI server 610 transmits service requests received from users to the vehicle manager 620, and the vehicle manager 620 assigns AVs 110 to the service requests. More broadly, the vehicle manager 620 directs the movements of the AVs 110 in the fleet. For example, the vehicle manager 620 may instruct AVs 110 to drive to other locations while not servicing a user, e.g., to improve geographic distribution of the fleet, to anticipate demand at particular locations, to drive to a charging station for charging, etc. The vehicle manager 620 also instructs AVs 110 to return to AV facilities for recharging, maintenance, or storage. The vehicle manager 620 may interface with a navigation system, which selects a route for an AV 110 to follow, and may select locations for the AV 110 to stop. The navigation system may be a component of the vehicle manager 620, a separate component of the fleet management system 120, or a component of the onboard computer 150 (e.g., in the path planning system 540). Alternatively, navigation functions may be distributed across multiple systems, including the AV 110 and the fleet management system 120**.

As an example, the UI server 610 receives a service request from a user, such as a request for a ride, and the UI server 610 passes this request to the vehicle manager 620. The vehicle manager 620 selects an AV 110 of the fleet to carry out the service request. The vehicle manager 620 identifies the origin location (e.g., starting point of the AV 110), destination location (e.g., drop-off location), and any waypoints (e.g., location to pick up the user). The navigation system determines a route for the AV 110 (e.g., the route 220 or the route 320) using map data in the map database 630, accounting for any TTRs in the map database 630, and transmits data describing the route to the AV 110. The vehicle manager 620 may receive updates about the location of the AV 110. The vehicle manager 620 may also handle communications with AVs 110, e.g., receiving TTR data from AVs 110, and transmitting updated map data (e.g., data describing new TTRs) to AVs 110.

The map database 630 stores a detailed map of a region or regions serviced by the AVs 110. The map database 630 may include the same data described with respect to the map database 510 in FIG. 5. The map database 630 may serve as a map data repository, and AVs 110 may retrieve copies of the map database 630, or portions of the map database 630, from the fleet management system 120. For example, the map database 630 may store maps for multiple regions (e.g., multiple states, multiple cities, and/or multiple countries), and an AV 110 in a particular region (e.g., a particular city) may download the map data for the region in which the AV 110 is operating.

The historical driving data 640 stores data describing driving activity of the fleet of AVs 110. The historical driving data 640 may be used to train one or more models at the fleet management system 120. The historical driving data 640 may include data relating to delays caused by TTRs, which can be used to train a model for routing costs of TTRs. For example, the historical driving data 640 may include data describing durations that AVs 110 were temporarily stuck or otherwise stopped, durations that AVs 110 were engaged in remote assistance sessions, and/or retrieval events in which a human operator moved a stuck AV 110.

The TTR system 650 includes hardware and/or software configured to generate TTRs and manage existing TTRs. The TTR system 650 interfaces with other components of the fleet management system 120. For example, the TTR system 650 receives data about detected TTRs from the vehicle manager 620, which receives the data from AVs 110. The TTR system 650 updates the map database 630 with data describing TTRs and/or has the vehicle manager 620 propagate data about new TTRs and/or updates about existing TTRs to AVs 110 in the fleet. In this example, the TTR system 650 includes a TTR data generator 660, a cost model 670, a duration model 680, and a TTR database 690.

The TTR data generator 660 generates TTRs based on data received from one or more AVs 110. As described above, AVs 110 transmit data describing detected TTRs to the fleet management system 120. The TTR data generator 660 may generate data describing a TTR (which may be propagated to AVs 110 and added to the map database 630) based on the data received from the AV 110. For example, the TTR data generator 660 may determine to generate TTR data after certain conditions have been met, e.g., the TTR has been detected for at least a threshold time period (e.g., for at least 30 seconds, or for as long as the AV 110 that detected the TTR was able to detect the TTR). As another example, the TTR data generator 660 may determine to generate the TTR data after the TTR has been observed by multiple different AVs 110, or from multiple different angles.

The TTR data generator 660 generates a data set for the TTR that may include, for example, the TTR type (e.g., construction, emergency response, or any of the other types described above) and the TTR shape (e.g., a polygon surrounding the TTR). As described above, the TTR type and the TTR polygon may be determined by the AV 110 reporting the TTR. The TTR data generator 660 may further include a cost and a duration in the TTR data set. The TTR data generator 660 may determine the cost and/or duration using one or more rules. For example, the TTR data generator 660 may select a first cost for a full road blockage, and a second, lower cost for a partial-road blockage (e.g., a single-lane blockage on a multi-lane road). As another example, the TTR data generator 660 may select a first duration for a first type of TTR, and a second duration for a second type of TTR.

In some embodiments, a cost model 670 is used to determine the cost. The cost model 670 may be a machine-learned model trained based on the historical driving data 640, and in particular, based on data describing delays caused by TTRs, as described above. More particularly, a training data set for the cost model 670 may include delays in the historical driving data 640 correlated to historical TTRs described in the TTR database 690. The TTR database 690 may include features of the TTRs, such as shape or polygon, the extent of the roadway blocked, the TTR type, etc. The cost model 670 may be trained to predict a routing cost (e.g., a routing delay) based on one or more input features, where the features correspond to the generated TTR data or are derivable from the TTR data (e.g., the extent of the roadway blocked may be determined based on the TTR polygon and roadway geometry data stored in the map database 630).

In some embodiments, a duration model 680 is used to determine the duration of the TTR. The duration model 680 may be a machine-learned model trained based on the historical TTR data, e.g., data describing previous TTRs stored in the TTR database 690. As noted above, the TTR database 690 may include features of the TTRs, such as shape or polygon, the extent of the roadway blocked, the TTR type, etc. To train the duration model 680, the TTR database 690 may also include durations for the historical TTRs, which may be based on TTRs being observed by one or more AVs 110 over a period of time. For example, for a given TTR, the TTR database 690 may store a time of the first detection and a time of the last detection; the TTR duration may be assumed to be the difference between the time of first detection and the time of last detection. The duration model 680 may be trained to predict a TTR duration based on one or more input features, where the features correspond to the generated TTR data or are derivable from the TTR data, as described above.

The TTR database 690 stores data describing current, and in some cases, historical TTRs. In some embodiments, the TTR system 650 includes a first database describing current or active TTRs (e.g., TTRs that have been recently observed, and for which the set duration has not elapsed without a recent detection) and a second database describing historical TTRs. The TTR database 690 may include, for a given TTR, the TTR location, polygon, type, and duration. In various embodiments, additional or fewer TTR properties may be included for each TTR.

Example Process for Generating and Propagating TTR

Figure 7:
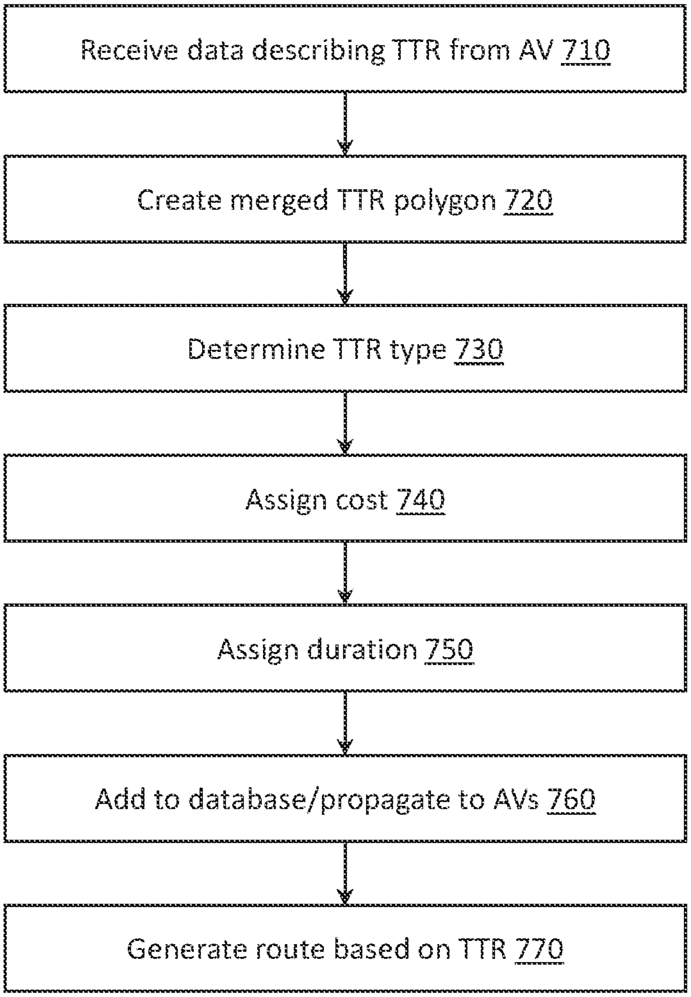
FIG. 7 is a flow diagram of a process for generating and propagating a temporary traffic restriction according to some embodiments of the present disclosure.

FIG. 7 is a flow diagram of a process for generating and propagating a temporary traffic restriction according to some embodiments of the present disclosure. At 710, the fleet management system 120 (e.g., the vehicle manager 620) receives data describing a TTR from an AV 110. The TTR detector 570 may detect the TTR and the communications interface 560 may transmit the TTR data as described with respect to FIG. 5. The TTR data may describe a shape and a location of a TTR. For example, the shape may include a polygon. The fleet management system 120 may receive numerous data transmissions from the AV 110 describing the TTR across a period of time, e.g., 10 seconds, 30 seconds, 60 seconds, 90 seconds, etc. The data transmissions may be sent at some interval, e.g., every 0.5 seconds, every 1 second, every 5 seconds, etc.

At 720, the fleet management system 120 (e.g., the TTR system 650) creates a merged TTR polygon describing the TTR detected by the AV 110. The TTR polygon represents a portion of a roadway corresponding to the TTR. For example, as noted above, the fleet management system 120 may receive multiple polygons collected over a period of time. The TTR data generator 660 may identify at least a subset of the received polygons that have an overlapping geometry and merge the identified polygons (e.g., a subset of the polygons) into a single polygon. To merge the polygons, the TTR data generator 660 may select a contiguous area that is included in at least a threshold number or proportion of the identified polygons, e.g., the largest contiguous area of points that are included in at least 75% of the overlapping polygons.

At 730, the fleet management system 120 (e.g., the TTR system 650) assigns a routing cost to the TTR. As described above, the routing cost relates to an expected time for an AV 110 to navigate around the TTR on the roadway. For example, the TTR system 650 generates a routing cost using the cost model 670, as described with respect to FIG. 6.

At 740, the fleet management system 120 (e.g., the TTR system 650) assigns a duration to the TTR. As described above, the duration may be an estimated length of time for which the TTR is expected to block traffic; the duration is a length of time for which the TTR is considered when calculating routes for AVs to traverse. For example, the TTR system 650 generates a duration using the duration model 680, as described with respect to FIG. 6.

At 760, the fleet management system 120 (e.g., the TTR system 650) adds the TTR to a database (e.g., to the TTR database 690 and/or the map database 630). The fleet management system 120 (e.g., the TTR system 650) also propagates the TTR to AVs in the fleet, e.g., transmits the TTR data (e.g., polygon shape, type, cost, and duration) to AVs 110 for inclusion in the local map databases 510. In some embodiments, the map database 510 on the AVs 110 may be updated based on changes to the map database 630.

At 770, the fleet management system (e.g., the vehicle manager 620) or the AV 110 (e.g., the path planning system 540) generates a route or path for the vehicle to traverse based on the TTR. For example, the vehicle manager 620 selects a route for the AV 110 to follow to a particular destination location, where the route is selected to avoid a TTR. As another example, the path planning system 540 determines a path for the AV 110 based on the TTR data, e.g., the path planning system 540 plans a maneuver that avoids driving in a lane with a TTR, so that the AV 110 does not become stuck at the TTR.

Example Process for Matching and Updating TTR

As noted above, after a first AV (e.g., AV 110*a*) has detected a TTR and the TTR system 650 has added the TTR to the TTR database 690 and propagated information about the TTR to other AVs in the fleet, the same AV (e.g., AV 110*a*) or a different AV (e.g., AV 110*b*) may capture data in the location of the TTR at a later time. This information can be used to determine whether the TTR is still present, if the TTR is no longer there and the blocked portion of roadway has reopened, or if the TTR has changed, e.g., if a disabled vehicle has changed to an emergency response (possibly with a different shape to account for the emergency response vehicles), or if the shape of a construction site has changed. In some embodiments, an AV 110 may be specifically instructed to capture TTR data for an existing TTR to determine the status of the existing TTR. For example, if the AV 110 does not have a current assignment, the fleet management system 120 can instruct the AV 110 to capture data describing existing TTRs. As another example, if an AV 110 is driving near an existing TTR, the fleet management system 120 can instruct the AV 110 to capture data describing a known TTR.

Figure 8:
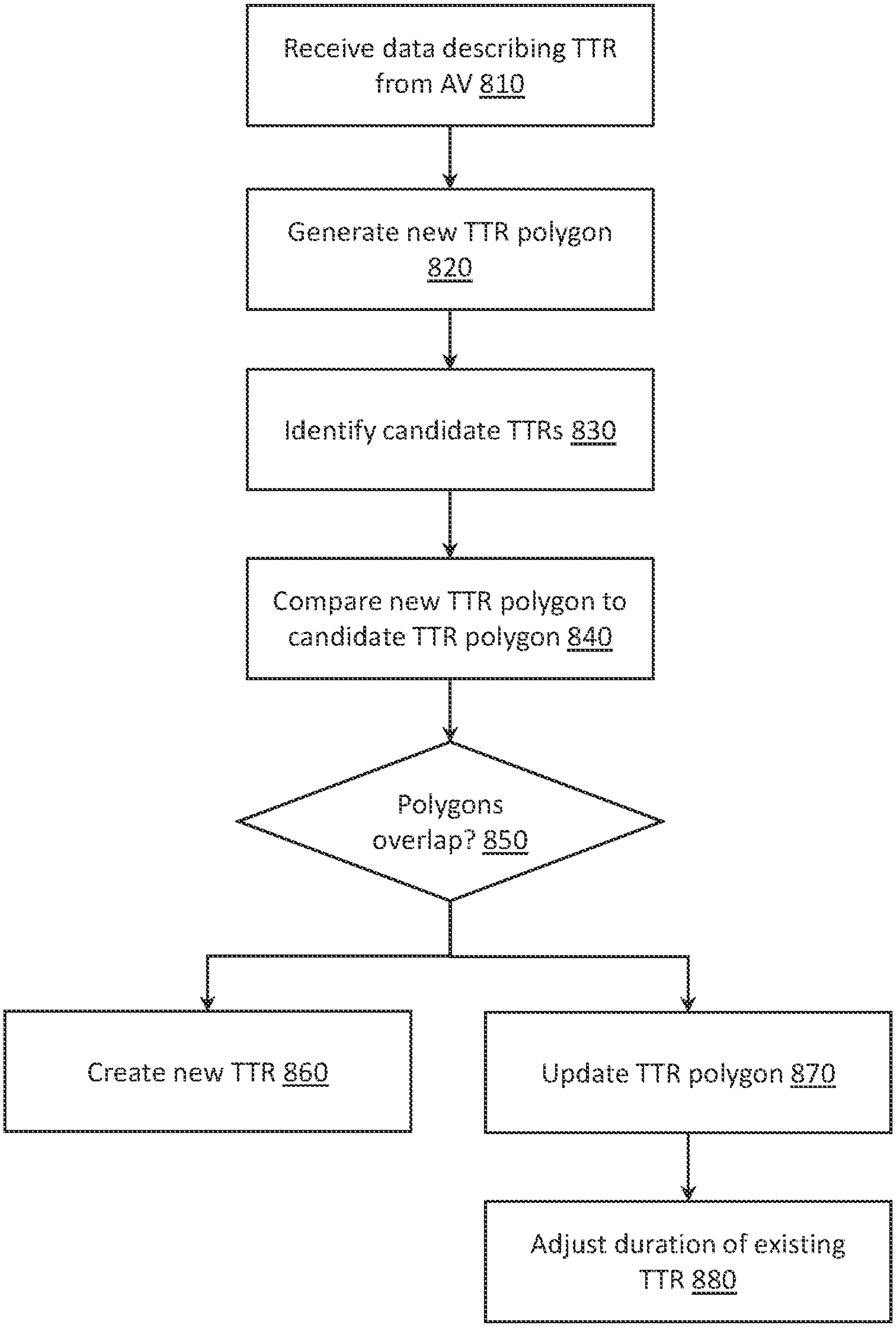
FIG. 8 is a flow diagram of a process for matching a new temporary traffic restriction to an existing temporary traffic restriction according to some embodiments of the present disclosure.

FIG. 8 is a flow diagram of a process for matching a new TTR to an existing TTR (e.g., a TTR in the TTR database 690) according to some embodiments of the present disclosure. At 810, the fleet management system 120 (e.g., the vehicle manager 620) receives data describing a TTR from an AV 110. The TTR detector 570 may detect the TTR and the communications interface 560 may transmit the TTR data as described with respect to FIG. 5. As described with respect to FIG. 7, the fleet management system 120 may receive numerous data transmissions from the AV 110 describing the TTR across a period of time.

At 820, the fleet management system 120 (e.g., the TTR system 650) generates a new TTR polygon. For example, the TTR data generator 660 may create a merged TTR polygon describing the TTR detected by the AV 110, as described with respect to FIG. 7.

At 830, the fleet management system 120 (e.g., the TTR system 650) identifies any candidate TTRs from the existing TTRs, e.g., from TTRs in the TTR database 690. For example, the TTR system 650 identifies candidate TTRs by comparing the location of the new TTR and the locations of the existing TTRs. For example, the TTR system 650 may select, as candidate TTRs, any existing TTRs in the TTR database 690 within 20 meters of the new TTR, or some other distance.

At 840, the fleet management system 120 (e.g., the TTR system 650) compares the polygon of the new TTR to the identified candidate TTR polygon(s). For example, the TTR system 650 compares boundaries of the new TTR polygon to the boundaries of a candidate polygon to determine if there is any overlap between the new polygon and the candidate polygon.

At 850, the fleet management system 120 (e.g., the TTR system 650) determines whether the new polygon and the existing polygon overlap. If the new polygon does not overlap any of the candidate polygons, at 860, the TTR system 650 creates a new TTR. For example, the TTR system 650 performs processes 730-760 described with respect to FIG. 7.

If the TTR system 650 determines that the new TTR corresponds to a candidate polygon, the TTR system 650 updates the existing TTR (i.e., the candidate TTR that matches the new TTR) based on the newly received data. At 870, the TTR system 650 (e.g., the TTR data generator 660) may generate an updated polygon shape based on the existing polygon and/or the new polygon. In some embodiments, the TTR system 650 updates the existing polygon data based on the new polygon. In other embodiments, the TTR data generator 660 generates a new polygon based on both the existing polygon and the new polygon. For example, the TTR data generator 660 may sample points from within the new polygon and within the existing polygon, e.g., by selecting a first random set of points (e.g., 50 points) within the new polygon and a second random set of points (e.g., 25 points) within the existing polygon. The TTR data generator 660 may select the same number of points from each polygon, or may select more points from the new polygon. Having selected the points, the TTR data generator 660 may fit a third polygon around the sampled points, and save the third polygon as the polygon for the TTR.

At 880, the TTR system 650 (e.g., the TTR data generator 660) adjusts the duration of the existing TTR. For example, if the TTR system 650 sets a TTR as active for 1 hour (i.e., by setting a TTR to expire or be removed at a time 1 hour in the future), the TTR data generator 660 may restart the clock for the TTR, e.g., by adjusting the expiration time for the TTR to 1 hour from the present time.

Select Examples

Example 1 provides a method including receiving data describing a shape and location of a traffic restriction; generating a polygon for the traffic restriction, the polygon including a portion of a roadway; generating a routing cost for the traffic restriction, the routing cost relating to an expected time for a vehicle to navigate around the traffic restriction on the roadway; generating map data describing the traffic restriction, the map data including a location of the traffic restriction, the routing cost of the traffic restriction, and a duration of the traffic restriction; and transmitting the generated map data to a vehicle; and generating a path for the vehicle to traverse, the path based on the map data describing the traffic restriction.

Example 2 provides the method of example 1, where the data describing the shape includes a plurality of polygons collected over a period of time, the plurality of polygons representing the traffic restriction, and the method further includes identifying at least a subset of the plurality of polygons having an overlapping geometry; and merging at least the subset of the plurality of polygons into the polygon describing the traffic restriction.

Example 3 provides the method of example 1, where the polygon describing the traffic restriction is a first polygon of a first traffic restriction, the method further including receiving data describing a second shape and second location of a second traffic restriction; determining a second polygon based on the second shape and second location; determining that the second traffic restriction intersects the first polygon; and updating the map data describing the first traffic restriction based on the second polygon, the updated map data including an updated duration of the traffic restriction.

Example 4 provides the method of example 3, where updating the map data describing the first traffic restriction based on the second polygon includes sampling points within the second polygon and the first polygon; fitting a third polygon around the sampled points; and updating the map data based on the first traffic restriction to include the third polygon.

Example 5 provides the method of example 3, where the second shape and the second location of the second traffic restriction are captured by an autonomous vehicle (AV), the AV instructed to capture the second shape and the second location based on received map data describing the first traffic restriction.

Example 6 provides the method of any preceding example, where a machine-learned model is used to generate the routing cost for the traffic restriction, the machine-learned model trained to predict a routing cost based on historical traffic restriction data and historical driving data, the historical driving data describing at least one of stuck events, remote assistance events, and vehicle retrieval events.

Example 7 provides the method of any preceding example, further including receiving a restriction type of the traffic restriction; and determining the duration of the traffic restriction based on the restriction type, where a first type of traffic restriction has a different expected duration than a second type of traffic restriction.

Example 8 provides a non-transitory computer-readable medium storing instructions that, when executed by a processor, cause the processor to: receive data describing a shape and location of a traffic restriction; generate a polygon for the traffic restriction, the polygon including a portion of a roadway; generate a routing cost for the traffic restriction, the routing cost relating to an expected time for a vehicle to navigate around the traffic restriction on the roadway; generate map data describing the traffic restriction, the map data including a location of the traffic restriction, the routing cost of the traffic restriction, and a duration of the traffic restriction; and transmit the generated map data to a vehicle; and generate a path for the vehicle to traverse, the path based on the map data describing the traffic restriction.

Example 9 provides the non-transitory computer-readable medium of example 8, where the data describing the shape includes a plurality of polygons collected over a period of time, the plurality of polygons representing the traffic restriction, and the instructions further cause the processor to: identify at least a subset of the plurality of polygons having an overlapping geometry; and merge at least the subset of the plurality of polygons into the polygon describing the traffic restriction.

Example 10 provides the non-transitory computer-readable medium of example 8, where the polygon describing the traffic restriction is a first polygon of a first traffic restriction, and the instructions further cause the processor to: receive data describing a second shape and second location of a second traffic restriction; determine a second polygon based on the second shape and second location; determine that the second traffic restriction intersects the first polygon; and update the map data describing the first traffic restriction based on the second polygon, the updated map data including an updated duration of the traffic restriction.

Example 11 provides the non-transitory computer-readable medium of example 10, where updating the map data describing the first traffic restriction based on the second polygon includes sampling points within the second polygon and the first polygon; fitting a third polygon around the sampled points; and updating the map data based on the first traffic restriction to include the third polygon.

Example 12 provides the non-transitory computer-readable medium of example 10, where the second shape and the second location of the second traffic restriction are captured by an autonomous vehicle (AV), the AV instructed to capture the second shape and the second location based on received map data describing the first traffic restriction.

Example 13 provides the non-transitory computer-readable medium of any of examples 8-12, where a machine-learned model is used to generate the routing cost for the traffic restriction, the machine-learned model trained to predict a routing cost based on historical traffic restriction data and historical driving data, the historical driving data describing at least one of stuck events, remote assistance events, and vehicle retrieval events.

Example 14 provides the non-transitory computer-readable medium of any of examples 8-13, where the instructions further cause the processor to: receive a restriction type of the traffic restriction; and determine the duration of the traffic restriction based on the restriction type, where a first type of traffic restriction has a different expected duration than a second type of traffic restriction.

Example 15 provides an apparatus, including a computer processor for executing computer program instructions; and a non-transitory computer-readable memory storing computer program instructions executable by the computer processor to perform operations including receiving data describing a shape and location of a traffic restriction; generating a polygon for the traffic restriction, the polygon including a portion of a roadway; generating a routing cost for the traffic restriction, the routing cost relating to an expected time for a vehicle to navigate around the traffic restriction on the roadway; generating map data describing the traffic restriction, the map data including a location of the traffic restriction, the routing cost of the traffic restriction, and a duration of the traffic restriction; and transmitting the generated map data to a vehicle; and generating a path for the vehicle to traverse, the path based on the map data describing the traffic restriction.

Example 16 provides the apparatus of example 15, where the data describing the shape includes a plurality of polygons collected over a period of time, the plurality of polygons representing the traffic restriction, and the operations further include identifying at least a subset of the plurality of polygons having an overlapping geometry; and merging at least the subset of the plurality of polygons into the polygon describing the traffic restriction.

Example 17 provides the apparatus of example 15, where the polygon describing the traffic restriction is a first polygon of a first traffic restriction, and the operations further include receiving data describing a second shape and second location of a second traffic restriction; determining a second polygon based on the second shape and second location; determining that the second traffic restriction intersects the first polygon; and updating the map data describing the first traffic restriction based on the second polygon, the updated map data including an updated duration of the traffic restriction.

Example 18 provides the apparatus of example 17, where updating the map data describing the first traffic restriction based on the second polygon includes sampling points within the second polygon and the first polygon; fitting a third polygon around the sampled points; and updating the map data based on the first traffic restriction to include the third polygon.

Example 19 provides the apparatus of any of examples 15-18, where a machine-learned model is used to generate the routing cost for the traffic restriction, the machine-learned model trained to predict a routing cost based on historical traffic restriction data and historical driving data, the historical driving data describing at least one of stuck events, remote assistance events, and vehicle retrieval events.

Example 20 provides the apparatus of any of examples 15-19, the operations further including receiving a restriction type of the traffic restriction; and determining the duration of the traffic restriction based on the restriction type, where a first type of traffic restriction has a different expected duration than a second type of traffic restriction.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method comprising:

receiving, from a first autonomous vehicle (AV), data describing a shape and location of a traffic restriction, the data generated by one or more sensors of the first AV perceiving the traffic restriction in an environment of the first AV;

generating a polygon for the traffic restriction, the polygon comprising a portion of a roadway;

generating a routing cost for the traffic restriction, the routing cost relating to an expected time for a vehicle to navigate around the traffic restriction on the roadway;

generating map data describing the traffic restriction, the map data comprising a location of the traffic restriction, the routing cost of the traffic restriction, and a duration of the traffic restriction;

transmitting the generated map data to a second AV;

generating a path for the second AV to traverse, the path based on the map data describing the traffic restriction;

instructing the second AV to capture updated data describing the shape and the location of the traffic restriction when the second AV is within a threshold distance of the location of the traffic restriction;

determining that the traffic restriction has been removed or changed based on the updated data captured by the second AV, wherein determining that the traffic restriction has been removed or changed comprises:

generating a new polygon based on the updated data captured by the second AV;

comparing the new polygon to the polygon for the traffic restriction to determine that the new polygon overlaps the polygon for the traffic restriction; and based on determining that the new polygon overlaps the polygon for the traffic restriction, determining that the traffic restriction has been removed or changed; and updating the map data describing the traffic restriction based on determining that the traffic restriction has been removed or changed.

2. The method of claim 1, wherein the data describing the shape comprises a plurality of polygons collected over a period of time, the plurality of polygons representing the traffic restriction, and the method further comprises:

identifying at least a subset of the plurality of polygons having an overlapping geometry; and merging at least the subset of the plurality of polygons into the polygon describing the traffic restriction.

3. The method of claim 1, wherein the polygon describing the traffic restriction is a first polygon of a first traffic restriction, the method further comprising:

receiving data describing a second shape and second location of a second traffic restriction;

determining a second polygon based on the second shape and second location;

determining that the second traffic restriction intersects the first polygon; and updating the map data describing the first traffic restriction based on the second polygon, the updated map data comprising an updated duration of the traffic restriction.

4. The method of claim 3, wherein updating the map data describing the first traffic restriction based on the second polygon comprises:

sampling points within the second polygon and the first polygon;

fitting a third polygon around the sampled points; and updating the map data based on the first traffic restriction to include the third polygon.

5. The method of claim 3, wherein the second shape and the second location of the second traffic restriction are captured by a third AV, the third AV instructed to capture the second shape and the second location based on received map data describing the first traffic restriction.

6. The method of claim 1, wherein a machine-learned model is used to generate the routing cost for the traffic restriction, the machine-learned model trained to predict a routing cost based on historical traffic restriction data and historical driving data, the historical driving data describing at least one of stuck events, remote assistance events, and vehicle retrieval events.

7. The method of claim 1, further comprising:

receiving a restriction type of the traffic restriction; and determining the duration of the traffic restriction based on the restriction type, wherein a first type of traffic restriction has a different expected duration than a second type of traffic restriction.

8. A non-transitory computer-readable medium storing instructions that, when executed by a processor, cause the processor to:

receive, from a first autonomous vehicle (AV), data describing a shape and location of a traffic restriction, the data generated by one or more sensors of the first AV perceiving the traffic restriction in an environment of the first AV;

generate a polygon for the traffic restriction, the polygon comprising a portion of a roadway;

generate a routing cost for the traffic restriction, the routing cost relating to an expected time for a vehicle to navigate around the traffic restriction on the roadway;

generate map data describing the traffic restriction, the map data comprising a location of the traffic restriction, the routing cost of the traffic restriction, and a duration of the traffic restriction;

transmit the generated map data to a second AV;

generate a path for the second AV to traverse, the path based on the map data describing the traffic restriction;

instruct the second AV to capture updated data describing the shape and the location of the traffic restriction when the second AV is within a threshold distance of the location of the traffic restriction;

determine that the traffic restriction has been removed or changed based on the updated data captured by the second AV, wherein determining that the traffic restriction has been removed or changed comprises:

generating a new polygon based on the updated data captured by the second AV;

comparing the new polygon to the polygon for the traffic restriction to determine that the new polygon overlaps the polygon for the traffic restriction; and based on determining that the new polygon overlaps the polygon for the traffic restriction, determining that the traffic restriction has been removed or changed; and update the map data describing the traffic restriction based on determining that the traffic restriction has been removed or changed.

9. The non-transitory computer-readable medium of claim 8, wherein the data describing the shape comprises a plurality of polygons collected over a period of time, the plurality of polygons representing the traffic restriction, and the instructions further cause the processor to:

identify at least a subset of the plurality of polygons having an overlapping geometry; and merge at least the subset of the plurality of polygons into the polygon describing the traffic restriction.

10. The non-transitory computer-readable medium of claim 8, wherein the polygon describing the traffic restriction is a first polygon of a first traffic restriction, and the instructions further cause the processor to:

receive data describing a second shape and second location of a second traffic restriction;

determine a second polygon based on the second shape and second location;

determine that the second traffic restriction intersects the first polygon; and update the map data describing the first traffic restriction based on the second polygon, the updated map data comprising an updated duration of the traffic restriction.

11. The non-transitory computer-readable medium of claim 10, wherein updating the map data describing the first traffic restriction based on the second polygon comprises:

sampling points within the second polygon and the first polygon;

fitting a third polygon around the sampled points; and updating the map data based on the first traffic restriction to include the third polygon.

12. The non-transitory computer-readable medium of claim 10, wherein the second shape and the second location of the second traffic restriction are captured by a third AV, the third AV instructed to capture the second shape and the second location based on received map data describing the first traffic restriction.

13. The non-transitory computer-readable medium of claim 8, wherein a machine-learned model is used to generate the routing cost for the traffic restriction, the machine-learned model trained to predict a routing cost based on historical traffic restriction data and historical driving data, the historical driving data describing at least one of stuck events, remote assistance events, and vehicle retrieval events.

14. The non-transitory computer-readable medium of claim 8, wherein the instructions further cause the processor to:

receive a restriction type of the traffic restriction; and determine the duration of the traffic restriction based on the restriction type, wherein a first type of traffic restriction has a different expected duration than a second type of traffic restriction.

15. An apparatus, comprising:

a computer processor for executing computer program instructions; and a non-transitory computer-readable memory storing computer program instructions executable by the computer processor to perform operations comprising:

receiving, from a first autonomous vehicle (AV), data describing a shape and location of a traffic restriction, the data generated by one or more sensors of the first AV perceiving the traffic restriction in an environment of the first AV;

generating a polygon for the traffic restriction, the polygon comprising a portion of a roadway;

generating a routing cost for the traffic restriction, the routing cost relating to an expected time for a vehicle to navigate around the traffic restriction on the roadway;

generating map data describing the traffic restriction, the map data comprising a location of the traffic restriction, the routing cost of the traffic restriction, and a duration of the traffic restriction;

transmitting the generated map data to a second AV;

generating a path for the second AV to traverse, the path based on the map data describing the traffic restriction;

instructing the second AV to capture updated data describing the shape and the location of the traffic restriction when the second AV is within a threshold distance of the location of the traffic restriction;

determining that the traffic restriction has been removed or changed based on the updated data captured by the second AV, wherein determining that the traffic restriction has been removed or changed comprises:

generating a new polygon based on the updated data captured by the second AV;

comparing the new polygon to the polygon for the traffic restriction to determine that the new polygon overlaps the polygon for the traffic restriction; and based on determining that the new polygon overlaps the polygon for the traffic restriction, determining that the traffic restriction has been removed or changed; and updating the map data describing the traffic restriction based on determining that the traffic restriction has been removed or changed.

16. The apparatus of claim 15, wherein the data describing the shape comprises a plurality of polygons collected over a period of time, the plurality of polygons representing the traffic restriction, and the operations further comprise:

identifying at least a subset of the plurality of polygons having an overlapping geometry; and merging at least the subset of the plurality of polygons into the polygon describing the traffic restriction.

17. The apparatus of claim 15, wherein the polygon describing the traffic restriction is a first polygon of a first traffic restriction, and the operations further comprise:

receiving data describing a second shape and second location of a second traffic restriction;

determining a second polygon based on the second shape and second location;

determining that the second traffic restriction intersects the first polygon; and updating the map data describing the first traffic restriction based on the second polygon, the updated map data comprising an updated duration of the first traffic restriction.

18. The apparatus of claim 17, wherein updating the map data describing the first traffic restriction based on the second polygon comprises:

sampling points within the second polygon and the first polygon;

fitting a third polygon around the sampled points; and updating the map data based on the first traffic restriction to include the third polygon.

19. The apparatus of claim 15, wherein a machine-learned model is used to generate the routing cost for the traffic restriction, the machine-learned model trained to predict a routing cost based on historical traffic restriction data and historical driving data, the historical driving data describing at least one of stuck events, remote assistance events, and vehicle retrieval events.

20. The apparatus of claim 15, the operations further comprising:

receiving a restriction type of the traffic restriction; and determining the duration of the traffic restriction based on the restriction type, wherein a first type of traffic restriction has a different expected duration than a second type of traffic restriction.

* * * * *